(No Model.)

J. UNDERWOOD.
HARROW.

No. 300,291. Patented June 10, 1884.

WITNESSES.
Chas. N. Leonard.
E. W. Bradford.

INVENTOR.
John Underwood,
PER
C. Bradford,
ATTORNEY.

UNITED STATES PATENT OFFICE.

JOHN UNDERWOOD, OF SHERIDAN, INDIANA.

HARROW.

SPECIFICATION forming part of Letters Patent No. 300,291, dated June 10, 1884.

Application filed December 21, 1883. (No model.)

*To all whom it may concern:*

Be it known that I, JOHN UNDERWOOD, of the town of Sheridan, county of Hamilton, and State of Indiana, have invented certain new and useful Improvements in Harrows, of which the following is a specification.

My said invention relates to an improvement in harrows; and it consists, principally, in combining a series of revoluble pulverizing-bars with gangs of shares or teeth, so that the soil will be alternately rolled and harrowed, thereby more thoroughly pulverizing it, and making it smoother and more suitable for receiving the seed than can be done with harrows of the ordinary construction.

Figure 1:
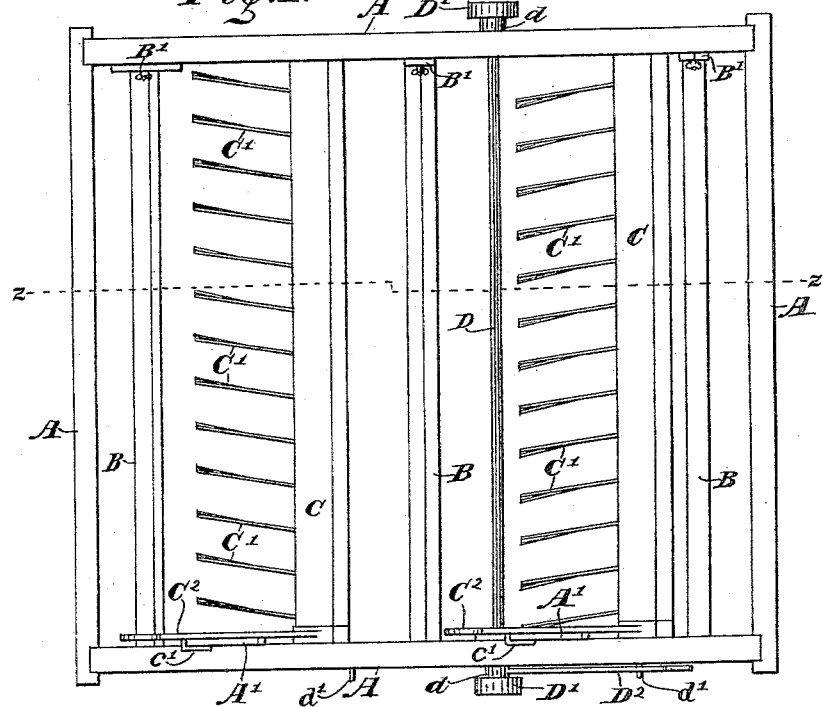
Figure 2:
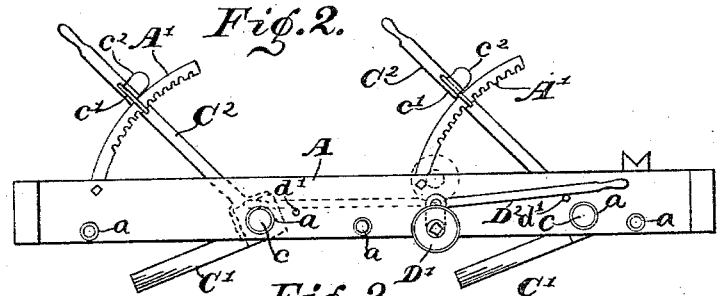
Figure 3:
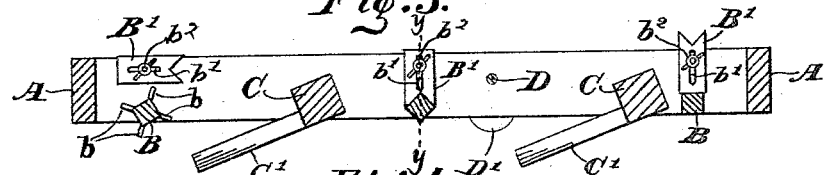
Figure 4:
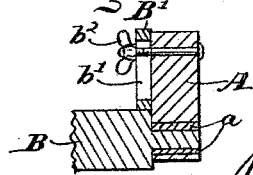

Referring to the accompanying drawings, which are made a part hereof, and on which similar letters of reference indicate similar parts, Figure 1 is a top or plan view of my improved harrow; Fig. 2, a side elevation; Fig. 3, a central sectional view, looking upwardly from the dotted line $z\ z$, Fig. 1; and Fig. 4, a detail sectional view on the dotted line $y\ y$, Fig. 3.

In said drawings, the portions marked A represent the frame of the machine; B, the revoluble pulverizing-bars; C, the beams on which the shares or teeth are mounted, and D a crank-shaft.

The frame A is of any ordinary or approved construction, and is adapted to carry the various beams, shafts, and revoluble pulverizing-bars employed. The side pieces are provided with bearings $a$, in which the ends of said pulverizing bars and beams are journaled. Braces (not shown) are usually employed to make the frame rigid, and a seat for the driver may also be mounted on said frame, if desired.

The revoluble pulverizing-bars B are preferably square bars of iron of suitable size to do their work, and they are journaled in bearings in the side pieces of the frame-work. In the construction of harrow shown there are preferably three of said bars—one in front, one between the two beams, and one in the rear of the hind beam bearing the teeth; but in different constructions the pulverizing-bars would be located to suit the construction. Pins $b$ may be inserted through these bars at intervals, projecting a short distance beyond the surface of the bar, as shown, and thereby insure that the pulverizing-bar shall revolve instead of drag, as these will catch in the soil and keep the bar continually in rotation. If, for any reason, it is desired to have the bars drag instead of revolve, these pins may be withdrawn and a detent, B', used to hold said bars from revolving. One end of said detent is notched to fit onto the corner of a bar, (see Fig. 3,) and the other end is square. It is provided with a longitudinal slot, $b'$, and is secured to the side piece of the frame, just above the end of a bar, by a bolt and thumb-nut, $b^2$. When it is desired to hold the bar with its corner down, the detent is turned so that its notched end will fit onto the opposite corner of the bar, and is secured in this position by the thumb-nut $b^2$. (See center of Fig. 3.) When it is desired to hold the flat side of the bar down, the square end of the detent is placed upon the top side of said bar and secured in this position, as before. (See right of Fig. 3.) When these detents are not in use, they are turned down longitudinally of the side piece and secured in this position, (see left of Fig. 3,) where they are entirely out of the way, and do not interfere with the pulverizing-bar in any way; or they may be left off of the harrow entirely, when desired.

The beams C are usually of wood, and have gudgeons $c$ formed on their ends, which are journaled in the bearings $a$ in the side pieces of the frame A. The shares or teeth C' are secured to the under side of these beams C by bolts or other appropriate means. They are formed somewhat in the shape of knives, their edges being sharp and adapted to cut the soil. They are set at an angle, as shown, and their ends are somewhat curved, so as to turn up the soil. The shares of one gang are set at an angle and those of the other at another angle, so that each will cut across the work of the other. Other forms of teeth may be used, if desired; but I regard this construction as preferable. A lever, $C^2$, is rigidly secured to one end of each beam, by means of which the depth to which the teeth enter the soil may be regulated. In the construction shown the lever is held in the desired position by a segmental bar, A', which is pivoted to the side piece of the frame A and passes up through a staple, $c'$, in the side of the handle, which engages with notches in the edge of said bar A'. A spring, $c^2$, or other appropriate means, operates to hold said bar in engagement with the staple, as will be readily understood. Various other constructions of levers may be used, however, to accomplish the same purpose, and I do not, therefore, desire to limit myself to the one shown, but show it as the preferable, on account of its simplicity and strength.

The crank-rod D is journaled in the side pieces of the frame, and has the cranks $d$ upon its ends, which bear trucks D'. It is operated by a lever, $D^2$, and the trucks D' thus raised from or thrown upon the ground. When it is desired to move the machine from one field to another, this lever is thrown forward into the position shown in Fig. 2, which throws the trucks upon the ground, pins $d'$ in the side of the frame preventing the crank from turning too far, and the front end of the harrow is thus raised free from the ground. When the machine is in operation, this lever is thrown back, as shown in dotted lines, and the trucks are thus thrown up out of the way. The attachment of these trucks and operating mechanism is only to adapt the machine to be more easily moved, and, as will be readily understood, is not necessary to the operation of the machine itself, and may be dispensed with when, for economical or other reasons, it is desired so to do.

The double-trees may be secured to the front part of the frame-work by having hooks or staples set therein on which to hang them, or in any other manner desired.

In operation the soil is first rolled by the front revoluble pulverizing-bar, which breaks up the lumps and clods rather than rolls the ground smooth. The first gang of teeth then thoroughly cuts up and loosens the soil. The second revoluble pulverizing-bar then passes over it and again operates to break up any lumps that may have been thrown up by the teeth. The second gang of teeth then passes over and further cuts and loosens the soil, passing through and throwing the dirt at an opposite angle from the first gang, thereby more thoroughly doing the work. The hind revoluble pulverizing-bar then passes over the work and leaves the soil in a very light and smooth condition, suitable to receive the seed, smoothing and finely pulverizing the soil preparatory to sowing the seed being the use for which my improved harrow is especially designed.

Having thus fully described my said invention, what I claim as new, and desire to secure by Letters Patent, is—

1. The combination, in a harrow, of the frame A, the revoluble pulverizing-bar B, journaled in said frame, the detent B', secured to the frame just above the end of the pulverizing-bar, and adapted to fit down onto said bar, with means for securing it in this position, and the beam C, bearing teeth C', substantially as described, and for the purposes specified.

2. The combination, in a harrow, of the frame A, the beams C, journaled in bearings in said frame, square pulverizing-bars B, interposed between said beams, said beams bearing shares or teeth C', which are set at an angle with the beam, and levers $C^2$, rigidly secured to the end of said beam as a means for operating the same, with means for securing the same in position, substantially as set forth.

3. The combination, in a harrow, of the frame A, square revoluble pulverizing-bars B, journaled therein, the detents B', secured to the frame, and adapted to be fitted against said bars, with means for securing them in position, the beams C, bearing shares or teeth C', said shares or teeth being set at an angle with the beam, and levers $C^2$, secured to the ends of said beams as a means for regulating the depth to which the teeth shall enter the soil, all arranged and operating substantially as described, and for the purposes specified.

4. The combination, in a harrow, of the frame A, the beams C, bearing shares or teeth C', and the square revoluble pulverizing-bars B interposed between said beams C, said bars being provided with outwardly-projecting pins $b$, substantially as described, and for the purposes specified.

In witness whereof I have hereunto set my hand and seal, at Indianapolis, Indiana, this 15th day of December, A. D. 1883.

JOHN UNDERWOOD. [L. S.]

In presence of—
    E. W. BRADFORD,
    CHAS. L. THURBER.